United States Patent
Torii

(10) Patent No.: US 7,944,801 B2
(45) Date of Patent: May 17, 2011

(54) INFORMATION RECORDING AND/OR REPRODUCING APPARATUS HAVING TWO PHOTODETECTORS TO CONTROL THE LIGHT INTENSITY OF TWO LIGHT SOURCES WITH DIFFERENT WAVELENGTHS

(75) Inventor: Shinnosuke Torii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/253,666

(22) Filed: Oct. 17, 2008

(65) Prior Publication Data
US 2009/0122685 A1 May 14, 2009

(30) Foreign Application Priority Data

Nov. 8, 2007 (JP) ................................ 2007-290734

(51) Int. Cl.
*G11B 7/00* (2006.01)
(52) U.S. Cl. ..................................... 369/116; 369/53.26
(58) Field of Classification Search .................... 369/94, 369/44.23, 44.31, 44.37, 116, 53.26, 53.27, 369/112.02, 112.21, 112.18, 120
See application file for complete search history.

(56) References Cited

U.S. PATENT DOCUMENTS

| | | | |
|---|---|---|---|
| 6,510,115 B2 * | 1/2003 | Furuichi et al. | 369/47.5 |
| 2005/0111516 A1 * | 5/2005 | Hatano et al. | 369/112.16 |
| 2006/0245334 A1 * | 11/2006 | Nagata et al. | 369/112.28 |
| 2008/0165661 A1 * | 7/2008 | Maruyama et al. | 369/112.23 |

FOREIGN PATENT DOCUMENTS

| JP | 2004-133987 | 4/2004 |
|---|---|---|
| JP | 2006-79781 | 3/2006 |

* cited by examiner

*Primary Examiner* — Thang V Tran
(74) *Attorney, Agent, or Firm* — Fitzpatrick, Cella, Harper & Scinto

(57) ABSTRACT

An apparatus for effecting at least one of recording and reproducing information. A first light source has a light intensity and emits a light beam having an emission wavelength. A second light source has another light intensity and emits a light beam having an emission wavelength different from that of the first light source. An optical system guides a light beam emitted from the first light source to a recording medium and guides a light beam reflected from the recording medium to a first photodetector, which generates an output. Another optical system guides a light beam emitted from the second light source to the recording medium and guides another light beam reflected from the recording medium to the second photodetector. A separating optical element guides the light beam emitted from the first light source to the second photodetector, which generates an output. A control circuit receives the output generated by the second photodetector, and controls the light intensity of the first light source based on the output of the second photodetector.

16 Claims, 5 Drawing Sheets

INFORMATION RECORDING AND/OR REPRODUCING APPARATUS HAVING TWO PHOTODETECTORS TO CONTROL THE LIGHT INTENSITY OF TWO LIGHT SOURCES WITH DIFFERENT WAVELENGTHS

This application claims the benefit of Japanese Application No. 2007-290734, filed Nov. 8, 2007, which is hereby incorporated by reference herein in its entirety.

BACKGROUND OF THE INVENTION

1. Field of the Invention

The present invention relates to an information recording and reproducing apparatus using optical discs such as, for example, a CD, a DVD, and a Blu-ray Disc.

2. Description of the Related Art

Information recording and reproducing apparatuses using optical discs are mainly directed to DVDs using red lasers. Also, in recent years, Blu-ray Discs, for example, using blue lasers have achieved densification of recording and reproducing information as compared with DVDs in the past.

Owing to this, an information recording and reproducing apparatus is demanded to be capable of recording and reproducing information on and from optical discs, such as a DVD and a Blu-ray Disc, using two different light sources. Japanese Patent Laid-Open No. 2006-79781 (first related art example, hereafter, referred to as the '781 document) discloses a technique to meet such a demand.

FIG. 4 shows an example shown in the '781 document. An optical pickup 306 includes first and second optical systems. The first optical system includes a first light-emitting element 320, a coupling lens 321, a first reflecting mirror 322, a first diffractive element 323, and a first beam splitter 324. Also, the first optical system includes a first collimator lens 325, a second beam splitter 326, a third beam splitter 327, a first objective lens 316, a cylindrical lens 328, a hologram element 329, a first photodetector 330, and a first monitoring photodetector 331.

The second optical system includes a second light-emitting element 332, a half-wave plate 333, a fourth beam splitter 334, a second diffractive element 335, and a fifth beam splitter 336. Also, the second optical system includes a second reflecting mirror 337, a second collimator lens 338, a raising mirror 339, a second objective lens 317, a multilens 340, a second photodetector 341, a third collimator lens 342, and a second monitoring photodetector 343.

The optical pickup 306 includes a moving base 307, necessary optical components provided on the moving base 307, and an object lens driver 308 arranged on the moving base 307. Bearings 307a and 307b are provided at both end portions of the moving base 307. The bearings 307a and 307b are respectively slidably supported by the guide shafts 304.

Also, a fixed block 310 is fixed to the moving base 307. Rear end portions of support springs 313 are connected to the fixed block 310. A movable block 311 is attached to the fixed block 310. Front end portions of the support springs 313 are connected to the movable block 311.

In the optical pickup 306 having the above-described configuration, when the first light-emitting element 320 emits laser light having a wavelength of about 650 nm, the coupling lens 321 converts an optical magnification of the laser light in a forward path. The laser light is reflected by the first reflecting mirror 322 and is diffracted by the first diffractive element 323, so that the laser light is separated into a chief ray and a marginal ray. The separated laser light passes through the first beam splitter 324, is collimated by the first collimator lens 325, and is incident on the second beam splitter 326, except for a portion of the laser light, passes through the second beam splitter 326, is reflected and raised by the third beam splitter 327, and is emitted on a recording surface of an optical disc by the first objective lens 316.

The laser light emitted on the recording surface of the optical disc is reflected by the recording surface, and is incident on the first beam splitter 324 as returning light through the first objective lens 316, the third beam splitter 327, the second beam splitter 326, and the first collimator lens 325. The laser light is reflected by the first beam splitter 324. The beam shape of the laser light is shaped by the cylindrical lens 328. The shaped laser light is incident on the first photodetector 330 through the hologram element 329. When the returning light is incident on the first photodetector 330, a signal, such as an RF signal, is detected, and recording or reproducing of an information signal is performed.

At this time, the portion of the laser light, emitted from the first light-emitting element 320 and being incident on the second beam splitter 326, is reflected by the second beam splitter 326 and is received by the first monitoring photodetector 331. The laser light to be emitted from the first light-emitting element 320 is controlled to have a substantially constant light intensity.

On the other hand, when the second light-emitting element 332 emits laser light having a wavelength of about 405 nm, the half-wave plate 333 rotates a deflection plane of the laser light. A portion of the laser light is reflected by the fourth beam splitter 334 and is diffracted by the second diffractive element 335, so that the laser light is separated into a chief ray and a marginal ray. The separated laser light is reflected by the fifth beam splitter 336, reflected by the second reflecting mirror 337, collimated by the second collimator lens 338, and incident on the second beam splitter 326. The laser light incident on the second beam splitter 326 is reflected by the second beam splitter 326, passed through the third beam splitter 327, raised by the raising mirror 339, and emitted on a recording surface of an optical disc by the second objective lens 317.

The laser light emitted on the recording surface of the optical disc is reflected by the recording surface, and is incident on the fifth beam splitter 336 as returning light, then through the second objective lens 317, the raising mirror 339, and the third beam splitter 327. The laser light passes through the fifth beam splitter 336. The multilens 340 converts an optical magnification of the laser light and shapes the laser light in a backward path. Then, the laser light is incident on the second photodetector 341. When the returning light is incident on the second photodetector 341, a signal, such as an RF signal, is detected, and recording or reproducing of an information signal is performed.

At this time, the portion of the laser light, emitted from the second light-emitting element 332 and being incident on the fourth beam splitter 334, passes through the fourth beam splitter 334, and is received by the second monitoring photodetector 343 through the third collimator lens 342. The laser light to be emitted from the second light-emitting element 332 is controlled to have a substantially constant light intensity.

With the above-described configuration, the optical systems corresponding to the two light sources are provided.

Meanwhile, regarding the appearance of an information recording and reproducing apparatus, reduction in size of the apparatus is demanded so as to be suitable for a notebook computer, a video camera, and the like. To meet this demand, Japanese Patent Laid-Open No. 2004-133987 (second related art example, hereafter, referred to as the '987 document) discloses a technique of sharing a servo/RF sensor by light sources so as to reduce the number of components.

FIG. 5 shows an example of the '987 document. A first light source 101 emits substantially linearly polarized light having a wavelength λ1. A second light source 102 emits substantially linearly polarized light having a wavelength λ2 (λ1<λ2). The first light source 101 is arranged so that a light beam thereof is incident on a first beam splitter 105 as s-polarized light. The first beam splitter 105 reflects a major portion of the light having the wavelength λ1, which is incident thereon as the s-polarized light. A portion of the light passing through the first beam splitter 105 is incident on a first light source power detector 113, so that the light is converted into current or voltage. Then, the current or voltage is inputted into a power control circuit 117, so that the current or voltage is used as a driving current control signal of the first light source 101. The light reflected by the first beam splitter 105 is substantially collimated by a collimator lens 107, reflected by a mirror 108, passed through a hologram 109, passed through a quarter-wave plate 110, thereby being converted into substantially circularly polarized light, and condensed by a condensing lens 111 onto a first information recording medium 112. Herein, it is assumed that the hologram 109 is a polarizing hologram that does not diffract the light (outgoing light) having the wavelength λ1 from the side of the first light source 101, but diffracts the light (returning light) having the wavelength λ1 from the side of the first information recording medium 112. Accordingly, the light can be guided from the first light source 101 to the first information recording medium 112. While the light reflected by the first information recording medium 112 travels through a backward optical path and reaches the first beam splitter 105, the light is converted into p-polarized light when passing through the quarter-wave plate 110. Thus, almost all of the light passes through the first beam splitter 105, and is incident on a second beam splitter 106.

Almost all of the light having the wavelength λ1 passes through the second beam splitter 106. The light passing through the second beam splitter 106 is incident on a signal detector 116 through an optical element 115. The light incident on the signal detector 116 is used for detection of various signals for focusing, tracking, RF, and the like, by a photodetector that is provided in the signal detector 116.

The second light source 102 is arranged such that the second light source 102 is rotated by an angle φ around an optical axis, so that the second beam splitter 106 contains both components of p-polarized light and s-polarized light. The second beam splitter 106 reflects almost all of the light having the wavelength λ2, which is incident thereon as the s-polarized light, but transmits the light with the component of the p-polarized light. The transmitting light is incident on a second light source power detector 114. The light is converted into current or voltage, and the current or voltage is input to the power control circuit 117, so that the current or voltage is used as a driving current control signal of the second light source 102. The light reflected by the second beam splitter 106 is passed through the first beam splitter 105, substantially collimated by the collimator lens 107, reflected by the mirror 108, passed through the hologram 109, passed through the quarter-wave plate 110, and condensed by the condensing lens 111 onto a second information recording medium 118.

With this configuration, for example, as long as the hologram 109 has wavelength selectivity, the light having the wavelength λ2 does not have to be diffracted. The light from the second light source 102 may be guided to the second information recording medium 118. While the light reflected by the second information recording medium 118 travels through a reversed optical path and reaches the second splitter 106, the component of p-polarized light is generated when the light passes through the quarter-wave plate 110. Thus, the light with the component of p-polarized light passes through the second beam splitter 106 and is incident on the signal detector 116 through the optical element 115. The light incident on the signal detector 116 is used for detection of various signals for focusing, tracking, RF, and the like, by the photodetector in the signal detector 116.

However, the above-described related art examples involve the following problems.

Regarding the example in the '781 document, two photodetectors for each light source, that is, four photodetectors, in total, are necessary. Hence, the number of components is increased. Also, the number of wiring lines is increased due to the increase in the number of photodetectors. An area of a flexible printed circuit (FPC), on which the wiring is arranged, may be increased, and the number of connectors of an electrical substrate to be electrically connected to the FPC may be increased. With these factors, the apparatus may be increased in size.

The example in the '987 document involves problems as described below in detail.

A servo/RF sensor has a photodetecting surface that is typically divided into a plurality of sections for calculating a servo signal. Hence, the photodetecting surface has to be highly accurately positioned with respect to an optical axis of light to be incident on the servo/RF sensor.

When the servo/RF sensor is shared by the light sources, as described according to the example in the '987 document, the following problems may occur.

When the position of the photodetecting surface is adjusted with respect to the optical axis corresponding to the first light source, the photodetecting surface may be misaligned with the optical axis corresponding to the second light source, depending on, for example, assembly accuracy of an optical element corresponding to the second light source, such as a positional shift of the second light source. Hence, the quality of a servo signal of the second light source is deteriorated.

Also, a method is provided in which the photodetecting surface is adjusted with respect to the optical axis corresponding to the first light source, and then, the second light source is moved, so that the position of the photodetecting surface is adjusted with respect to the optical axis of the second light source. With this method, however, the following problem occurs. In general, if an optical axis is misaligned with the center of the intensity distribution of the light beams to be incident on an objective lens, for example, when the objective lens is moved in a radial direction of an optical disc by tracking, or the like, the light intensity is seriously changed, and the signal quality may be deteriorated. Therefore, an adjustment method is used, in which the optical axis is aligned with the center of the intensity distribution of the light beams to be incident on the objective lens, by rotationally adjusting the light source around an axis perpendicular to the optical axis. As described above, however, when the position of the optical axis of light to be incident on the servo/RF sensor and the position of the photodetecting surface are adjusted, by moving the second light source, it is extremely difficult to rotationally adjust the light source. This is because it is necessary to use reflected light of light emitted from the objective lens to adjust the position of the photodetecting surface, whereas it is necessary to monitor the light emitted from the objective lens to observe the intensity distribution.

Further, a method is provided in which a flat plate is inserted between parallel light beams, and the flat plate is inclined so as to adjust the center of the intensity distribution. With this method, however, the number of components may be increased.

Also, if the flat plate is inclined in light beams that are not completely parallel light beams, but are slightly divergent or convergent light beams due to a variation in components or other factors, astigmatism is generated, and hence, the signal quality is deteriorated. As described above, with the example from the '987 document, the signal quality may be deteriorated.

SUMMARY OF THE INVENTION

The present invention provides an information recording and reproducing apparatus capable of reducing deterioration in signal quality and reducing the number of components, thereby realizing a reduction in size of the apparatus, in first and second optical systems having first and second light sources with different wavelengths.

An apparatus for effecting at least one of recording and reproducing information according to an aspect of the present invention includes a first light source having a light intensity and for emitting a light beam having an emission wavelength, a second light source having another light intensity and for emitting another light beam having an emission wavelength different from that of the light beam of the first light source. The apparatus further includes first and second photodetectors capable of generating outputs. Also included is a separating optical element configured to guide a light beam emitted from the first light source to the second photodetector, the second photodetector receiving the light beam and generating an output based on the received light beam and generating an output based on the received light beam. A control circuit for receiving the output generated by the second photodetector, and being configured to control the light intensity of the first light source based on the output of the second photodetector, is further included.

In another aspect of the invention, the apparatus described above further includes an optical system configured to guide the light beam emitted from the first light source to a recording medium, and to guide a light beam reflected from the recording medium to the first photodetector.

In another aspect of the present invention, an apparatus for effecting at least one of recording and reproducing information includes a blue semiconductor laser having a light intensity and for emitting a light beam, and a red semiconductor laser having another light intensity and for emitting another light beam. The apparatus further includes first and second photodetectors capable of generating outputs. Also included is a separating optical element configured to guide a light beam emitted from the blue semiconductor laser to the second photodetector, the second photodetector receiving the light beam and generating an output based on the received light beam. A control circuit for receiving the output generated by the second photodetector, and being configured to control the light intensity of the blue semiconductor laser based on the output of the second photodetector, is further included.

Further features of the present invention will become apparent from the following description of exemplary embodiments with reference to the attached drawings.

DESCRIPTION OF THE EMBODIMENT

An embodiment of the present invention is described below in detail with reference to the attached drawings.

Figure 1:
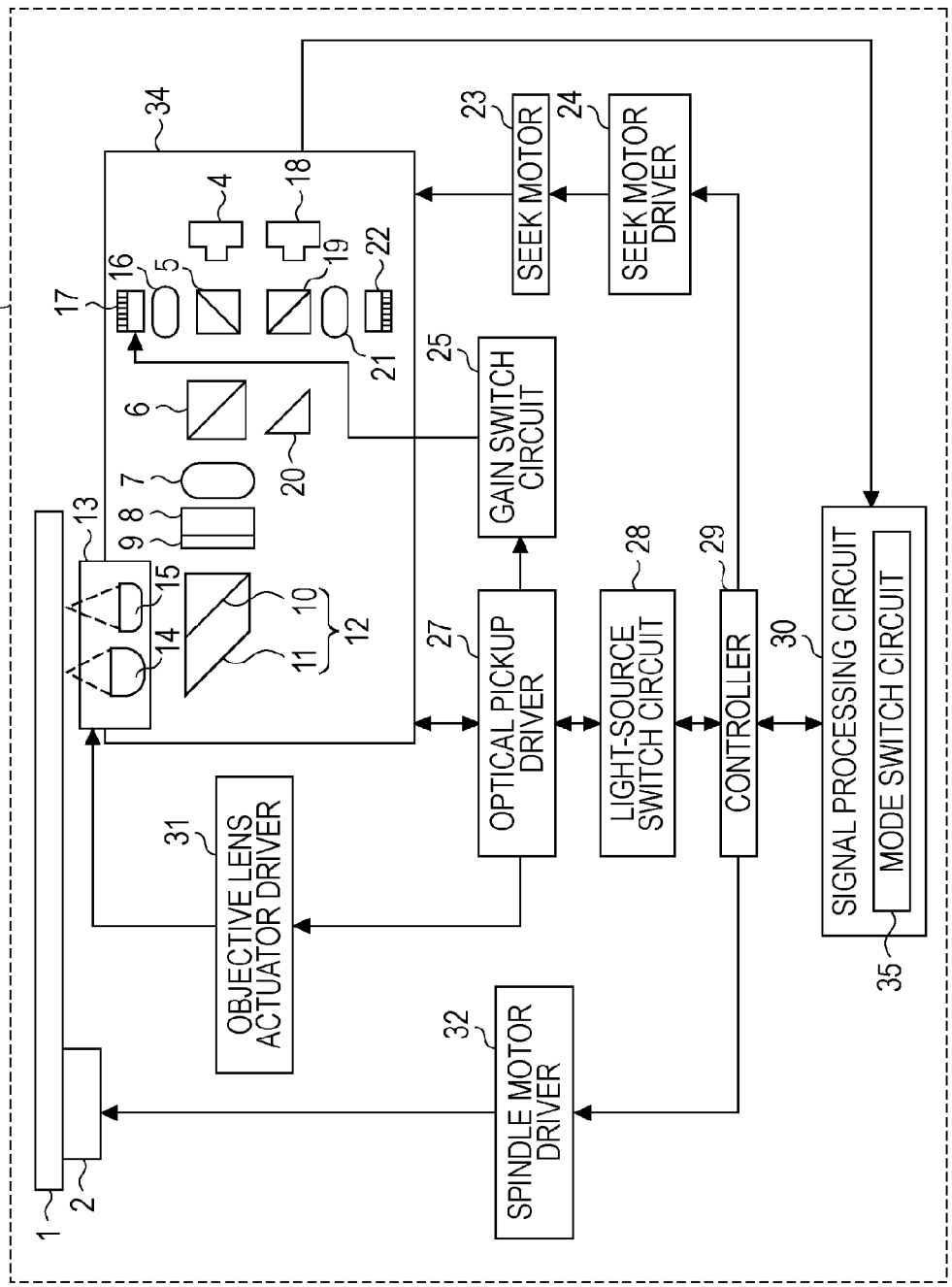
FIG. 1 schematically illustrates an optical disc drive apparatus according to an embodiment of the present invention.

FIG. 1 illustrates a general configuration of an optical disc drive apparatus 33 that serves as an information recording and reproducing apparatus of the present invention. An optical disc 1 serves as an optical recording medium. A spindle motor 2 rotates while the optical disc 1 is mounted thereon. A spindle motor driver 32 rotationally drives the spindle motor 2.

In this embodiment, the optical disc 1 may be one of, for example, a DVD or a Blu-ray Disc, corresponding to different light sources. An optical pickup 34 records and reproduces information on and from the optical disc 1. Herein, the optical pickup 34, mounted in the optical disc drive apparatus 33, includes first and second optical systems.

First, a case is described, in which the first optical system uses a blue semiconductor laser 4 as a first light source.

A light beam emitted as divergent light from the blue semiconductor laser 4, which serves as the first light source, is incident on a first dichroic polarizing beam splitter (hereafter, referred to as dichroic PBS) 5, which serves as a first separating optical element, and the light beam is separated into reflected light and transmitting light. The light beam reflected by the first dichroic PBS 5 passes through a second dichroic PBS 19, which serves as a second separating optical element, then passes through a second sensor lens 21, and is incident on a second photodetector 22, which serves as a photosensor. Accordingly, a monitor output signal for output control of the blue semiconductor laser 4 is generated. The dichroic PBS mentioned herein is wavelength dependent.

On the other hand, the light beam passing through the first dichroic PBS 5 passes through a dichroic beam splitter 6, and is substantially collimated by a collimator 7. The light beam passing through the collimator 7 is aimed at a deflecting mirror unit 12 through a liquid crystal element 8, which serves as a coma/spherical aberration correction unit, and through a quarter-wave plate 9 fixed to the liquid crystal element 8.

The liquid crystal element 8 generates differences of refractive indices among respective areas in an effective diameter, thereby generating a coma aberration and a spherical aberration. Hence, the liquid crystal element 8 cancels a coma aberration, which is caused by an inclination of the optical disc 1 with respect to the objective lens, and a spherical aberration, which is caused by an error of a substrate thickness of the optical disc 1, by using the generated coma and spherical aberrations. The technique of correcting aberrations with a liquid crystal element is an existing technique, and a description thereof is omitted.

The light beam incident on the deflecting mirror unit 12 passes through a dichroic film 10 of the deflecting mirror unit 12, then, is reflected by a reflecting film 11 perpendicularly to a disc surface of the optical disc 1, and is incident on a first objective lens 14, which is provided at an objective lens actuator 13. The objective lens actuator 13 is a typical wire-support type, and a description thereof is limited.

The light beam incident on the first objective lens 14 is focused at an information recording layer (not shown) of the optical disc 1, and information is recorded.

Also, the light beam reflected by the optical disc 1 is condensed by the first objective lens 14, passed through the dichroic beam splitter 6, and reflected by the first dichroic PBS 5. The light beam reflected by the first dichroic PBS 5 is incident on a first photodetector 17, which serves as a photosensor, through a first sensor lens 16. Accordingly, an information signal (RF) is reproduced, and servo error signals for focusing and tracking are generated. The servo method is an existing method (for example, focusing servo: astigmatism method, tracking servo: push-pull method), and a description thereof is omitted.

Next, a case is described in which the second optical system uses a second light source having an emission wavelength different from that of the first light source. Herein, the second light source employs a red semiconductor laser 18.

A light beam emitted as divergent light from the red semiconductor laser 18, which serves as the second light source, is incident on the second dichroic PBS 19, which serves as the second separating optical element, and the light beam is separated into reflected light and transmitting light. The light beam reflected by the second dichroic PBS 19 passes through the first dichroic PBS 5, which serves as the first separating optical element, then through the first sensor lens 16, and is incident on the first photodetector 17. Accordingly, a monitor output signal for output control of the red semiconductor laser 18 is generated.

On the other hand, the light beam passing through the second dichroic PBS 19 is deflected by a deflecting mirror 20, then reflected by the dichroic beam splitter 6, and substantially collimated by the collimator 7. The light beam passing through the collimator 7 is aimed at the deflecting mirror unit 12 through the liquid crystal element 8 and the quarter-wave plate 9.

When the red semiconductor laser 18 is used, the liquid crystal element 8 is controlled to correct only a coma aberration.

The light beam incident on the deflecting mirror unit 12 is reflected by the dichroic film 10 of the deflecting mirror unit 12 perpendicularly to a disc surface of an optical disc 1, and is incident on a second objective lens 15, which is provided at the objective lens actuator 13. The light beam incident on the second objective lens 15 is focused at an information recording layer (not shown) of the optical disc 1, and information is recorded.

Also, the light beam reflected by the optical disc 1 is condensed by the second objective lens 15, reflected by the dichroic beam splitter 6, and reflected by the second dichroic PBS 19. The light beam reflected by the second dichroic PBS 19 is incident on the second photodetector 22 through the second sensor lens 21. Accordingly, an information signal is reproduced, and servo error signals for focusing and tracking are generated. The servo method is an existing method (for example, focusing servo: astigmatism method, tracking servo: push-pull method), and a description thereof is omitted.

An objective lens actuator driver 31 controls driving of the objective lens actuator 13 in focusing and tracking directions.

An optical pickup driver 27 controls the blue semiconductor laser 4, the red semiconductor laser 18, the liquid crystal element 8, and other components, of the optical pickup 34. A light-source switch circuit 28 switches a laser between the blue semiconductor laser 4 and the red semiconductor laser 18 depending on the type of the optical disc 1 (for example, a Blu-ray Disc or a DVD). A gain switch circuit 25 switches an output gain between an output gain when the first detector 17 receives the reflected light from the optical disc 1, and an output gain when the first photodetector 17 receives the emitted light of the red semiconductor laser 18 for light-intensity control.

A seek motor 23 moves the optical pickup 34 in a radial direction of the optical disc 1. A seek motor driver 24 controls the seek motor 23.

A signal processing circuit 30 performs servo/RF processing through, for example, a processing of output signals from respective sensors provided at the optical pickup 34.

A mode switch circuit 35 switches a mode, depending on the light source to be used, to determine assignment of "generation of a servo error signal and an RF signal" and "generation of a light-source-output control signal" to the first and second photodetectors 17 and 22, respectively. In this embodiment, a mode for "the generation of the servo error signal and the RF signal" is called "servo/RF generation mode", whereas a mode for "the generation of the light-source-output control signal" is called "monitor output generation mode".

A controller 29 generally controls the optical disc drive apparatus 33, such as control of the respective drivers, by basically using the signal processing circuit 30. The controller 29 includes a CPU, a memory, and other components, to deal with a primary portion of sequence control for the respective drivers.

The optical disc drive apparatus 33 is constituted by the above-described components.

Next, an operation of the optical disc drive apparatus 33 is described in detail.

The controller 29 generally controls the spindle motor driver 32, the objective lens actuator driver 31, the optical pickup driver 27, and the seek motor driver 24. The spindle motor 2 is rotated by a desired rotation speed by the spindle motor driver 32. Accordingly, the optical disc 1 mounted on the spindle motor 2 is integrally rotated.

Also, when the seek motor driver 24 drives the seek motor 23, which is a stepping motor, the optical pickup 34 is moved to a certain position in the radial direction of the optical disc 1. The optical pickup driver 27 controls laser light from the blue semiconductor laser 4 or the red semiconductor laser 18. To move the first or second objective lens, 14 or 15, respectively, to follow a track arranged in the information recording layer of the optical disc 1, the objective lens actuator driver 31 controls driving current to be applied to the objective lens actuator 13 based on the above-described servo error signal.

Now, features according to this embodiment of the present invention are described.

Table 1 shows a design example of the optical systems described in this embodiment. Table 1 shows only values relating to the embodiment of the present invention.

TABLE 1

|  | First optical system (wavelength of 406 nm) | Second optical system (wavelength of 660 nm) |
|---|---|---|
| Dichroic PBS transmittance a in forward path | 90% | 90% |
| Optical efficiency b in forward path | 20% | 30% |

TABLE 1-continued

|  | First optical system (wavelength of 406 nm) | Second optical system (wavelength of 660 nm) |
|---|---|---|
| Optical efficiency c in backward path | 80% | 80% |

In Table 1, for each optical system, "dichroic PBS transmittance in forward path" represents a ratio of a light beam passing through the dichroic PBS to a light beam emitted from the light source. The residual light beam is reflected to be used for the output control of the light source. Also, "optical efficiency in forward path" represents a ratio of a light beam emitted from the objective lens to a light beam emitted from the light source.

Further, "optical efficiency in backward path" represents a ratio of a light beam to be incident on the photodetector through the objective lens to a light beam reflected by the recording medium.

Table 2 shows a ratio of a sensitivity of the photodetector of this embodiment to each wavelength. In this embodiment, it assumed that the first and second photodetectors, 17 and 22, respectively, have equivalent wavelength-dependent sensitivities, for simplification of the description.

TABLE 2

|  | Use wavelength | |
|---|---|---|
|  | 406 nm (blue) | 660 nm (red) |
| Ratio d of sensitivity (A/W) | 1 | 1.5 |

Table 3 shows an example of reflectance of the optical disc 1 according to this embodiment. In this embodiment, the optical disc 1 may have two types of specifications, in which a single information recording layer is provided, and in which double information recording layers are provided. Examples of both types are described.

TABLE 3

|  | Use wavelength | |
|---|---|---|
|  | 406 nm (blue) | 660 nm (red) |
| Single-layer optical disc e | 20% | 50% |
| Double-layer optical disc f | 10% | 20% |

Table 4 shows an emitted light intensity of an objective lens, which is suitable for reproduction of each optical disc according to this embodiment.

TABLE 4

|  | Use wavelength | |
|---|---|---|
|  | 406 nm (blue) | 660 nm (red) |
| Single-layer optical disc g | 0.35 mW | 1 mW |
| Double-layer optical disc f | 0.7 mW | 1 mW |

In this embodiment, it is assumed that the emitted light intensity of an objective lens suitable for recording of each optical disc is ten times the emitted light intensity of the objective lens suitable for reproduction shown in Table 4.

Also, it is assumed that, in either of the first and second optical systems, the transmittance of the light beam, which is reflected by the dichroic PBS and reaches the corresponding photodetector for the output control of the light source, is 100%.

Figure 2:
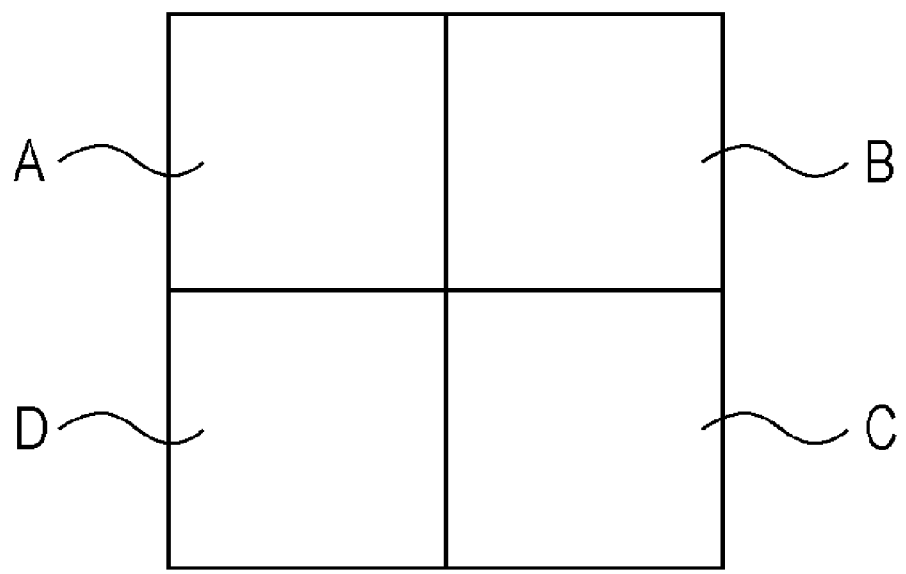
FIG. 2 schematically illustrates a pattern of a photodetector according to an embodiment of the present invention.

FIG. 2 illustrates a sensor pattern of the first and second photodetectors, 17 and 22, respectively, according to this embodiment. In this embodiment, the first and second photodetectors, 17 and 22, respectively, both have a pattern divided into four sections. The output control of the light source uses the sum of light intensities of light beams incident on all four sections of the pattern (A+B+C+D).

Hence, an output of each photodetector "used for detection of an RF and/or a servo signal (RF/servo detection)" and an output of each photodetector "used for output control of a light source (for light-source-output control)" are calculated by expressions as follows:

For RF/servo detection:

$$\text{single-layer optical disc } c \times d \times e \times g \quad (1)$$

$$\text{double-layer optical disc } c \times d \times f \times h \quad (2)$$

For light-source-output control:

$$\text{single-layer optical disc } ((1-a) \times d \times g)/b \quad (3)$$

$$\text{double-layer optical disc } ((1-a) \times d \times h)/b \quad (4)$$

Table 5 shows ratios of the outputs obtained from each photodetector to an output of the photodetector "for RF/servo detection of the single-layer optical disc."

TABLE 5

|  |  | First photodetector | Second photodetector |
|---|---|---|---|
| For RF/servo detection | Single-layer optical disc | 1 | 1 |
|  | Double-layer optical disc | 1 | 0.4 |
| For light-souce-output control | Single-layer optical disc | 8.9 | 0.3 |
|  | Double-layer optical disc | 8.9 | 0.6 |

As shown in Table 5, the first photodetector 17 exhibits an output ratio in which the output for the light-source-output control is about nine times the output for the RF/servo detection. In general, if a ratio output of a photodetector is within ten times, a single gain may be used. In this embodiment, the above-described gain switch circuit 25 switches the output gain of the first detector 17 to one-tenth for the light-source-output control. Accordingly, a margin to saturation of the first photodetector 17 is increased. In this embodiment, the gain of the second photodetector 22 is not switched.

In general, a difference between a necessary light intensity during recording is ten or more times a necessary light intensity during reproducing. Hence, while the gain of each photodetector is switched between a gain from recording and a gain for reproducing, the gain switching is an existing technique, and a description thereof is omitted in this embodiment.

Also, while the gain of the photodetector is switched when recording media, such as a DVD-R or a DVD-RW, which have different reflectance values with respect to a single wavelength, are used, a description is also omitted, similarly.

Figure 3:
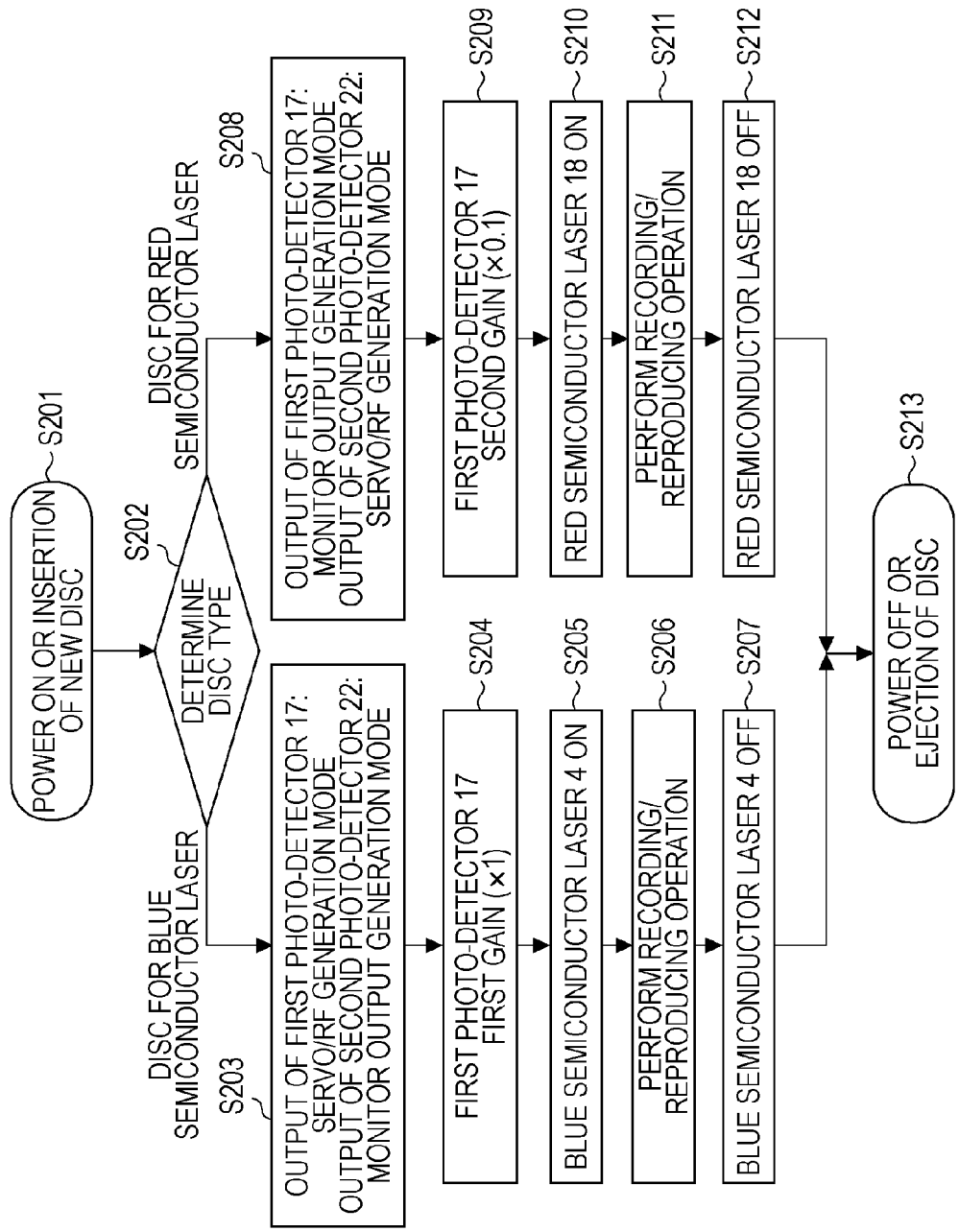
FIG. 3 is an operational flowchart of the optical disc drive apparatus according to an embodiment of the present invention.
Figure 4:
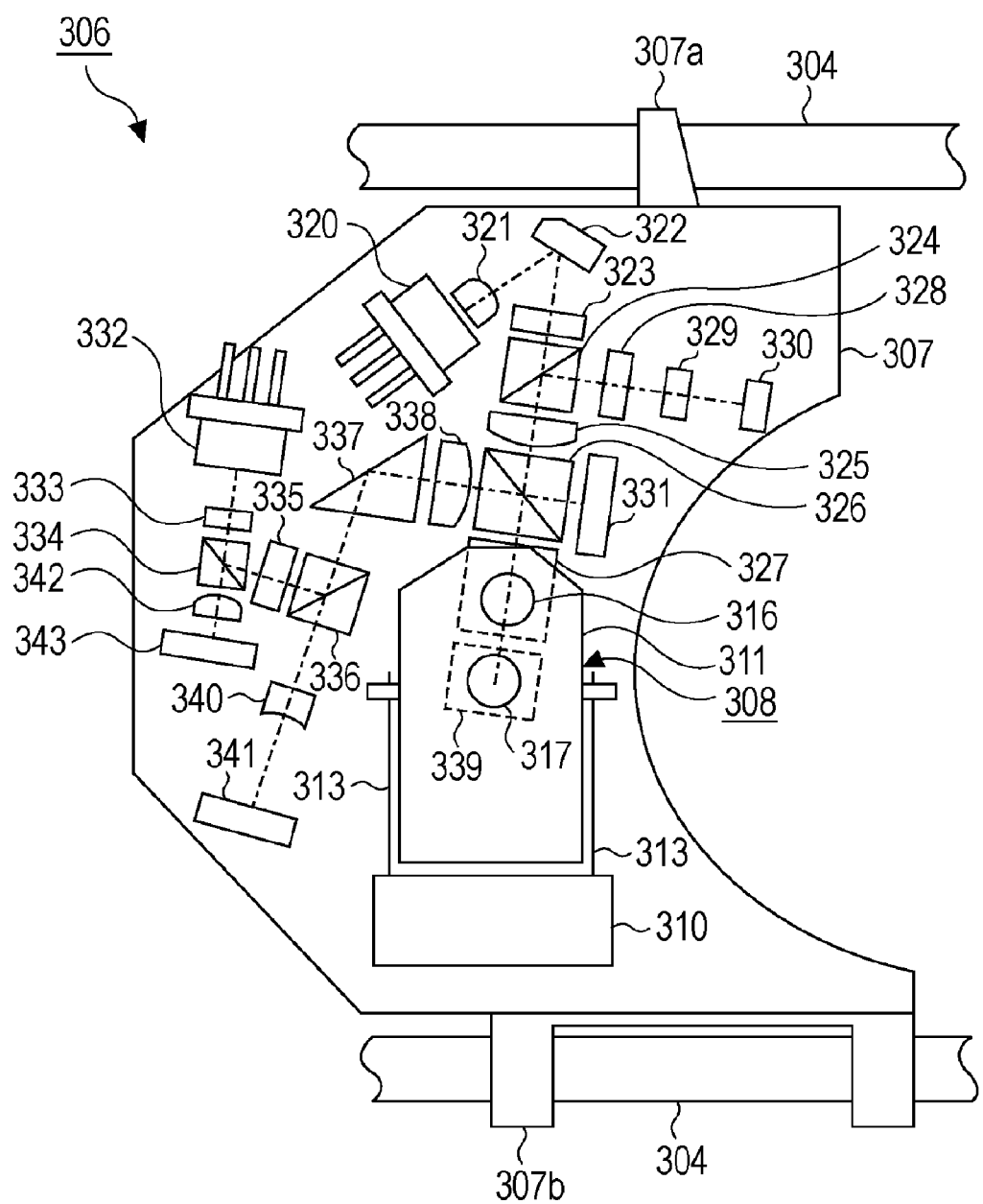
FIG. 4 schematically illustrates an optical system according to a first related art example.
Figure 5:
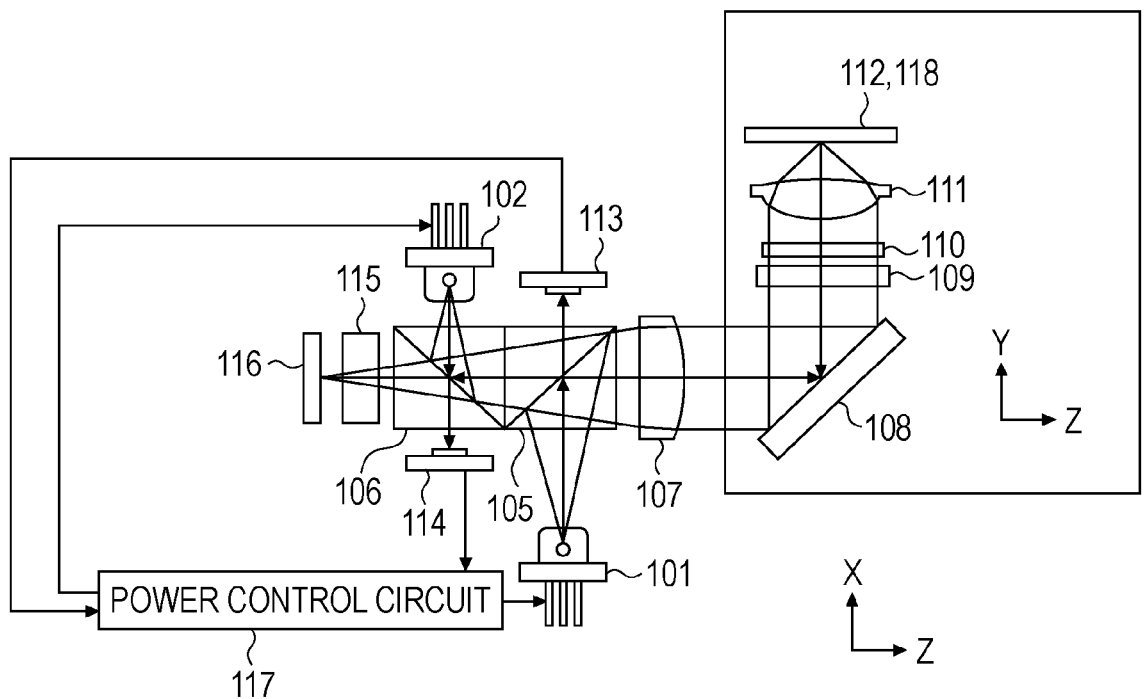
FIG. 5 schematically illustrates an optical system according to a second related art example.

FIG. 3 is an operation flowchart of the optical disc drive apparatus 33 according to this embodiment.

First, when the power of the apparatus is turned ON, or when the optical disc 1 is inserted (S201), the controller 29 determines the type of disc by an existing method, for example, by using a light intensity of reflected light from the optical disc 1, the light being emitted from a semiconductor laser having a certain wavelength (S202). When the optical disc is determined as one corresponding to a blue semiconductor laser (first light source), the signal processing circuit 30 controls the mode switch circuit 35 to switch an output processing portion of the first photodetector 17 to "the servo/RF generation mode", and to switch an output processing portion of the second photodetector 22 to "the monitor output generation mode" (S203). Then, the gain switch circuit 25 switches the gain of the first photodetector 17 to a first output gain (×1) (S204). Then, the blue semiconductor layer 4 is turned ON (S205) to perform a recording operation or a reproducing operation (S206). When the recording or reproducing operation is completed, the blue semiconductor laser 4 is turned OFF (S207). The power of the apparatus is turned OFF or the optical disc 1 is ejected (S213). Thus, the process is ended.

On the other hand, when the optical disc is determined to be one corresponding to a red semiconductor laser by the determination of the disc type (S202), the following process is followed. The signal processing circuit 30 controls the mode switch circuit 35 to switch the output processing portion of the first photodetector 17 to "the monitor output generation mode", and to switch the output processing portion of the second photodetector 22 to "the servo/RF generation mode" (S208). Then, the gain switch circuit 25 switches the gain of the first photodetector 17 to a second output gain (×0.1) (S209). Then, the red semiconductor laser 18 is turned ON (S210) to perform a recording operation or a reproducing operation (S211). When the recording operation or the reproducing operation is completed, the red semiconductor laser 18 is turned OFF (S212). The power of the apparatus is turned OFF, or the optical disc 1 is ejected (S213). Thus, the process is ended.

With the embodiment of the present invention, the number of photodetectors can be decreased as compared to the configuration of the example shown in the '781 document, thereby promoting a reduction in size of the apparatus.

Since the photodetector is used for the RF/servo detection and the light-source-output control, the number of wiring lines for signal transmission can also be decreased. The number of connectors of an electrical substrate can be reduced, and an area of a flexible printed circuit (FPC), on which wiring is arranged, can be decreased, thereby realizing a reduction in size of the apparatus.

Also, with the configuration of the embodiment of the present invention, the positions of the photodetectors can be adjusted by using the light beams in the forward and backward paths in the optical systems. Accordingly, deterioration in signal quality can be reduced as compared to the configuration of the example in the '987 document.

It should be noted that the present invention is not limited to the configuration of this embodiment.

For example, for the light-source-output control, a certain section (for example, merely A, or A+B) of the pattern of the photodetecting surface shown in FIG. 2 may be used. When another photodetecting pattern (not shown), for example, a pattern of a typical differential push-pull (DPP) method, is used, a similar advantage to that of the present invention can be obtained.

For example, as long as the transmittance of the first dichroic PBS 5 for the emitted light from the red semiconductor laser 18 is reduced to one-tenth, the ratio of the output of the first photodetector 17 during the RF/servo detection and the output during the light-source-output control becomes about 1:1. Accordingly, the gain switch circuit 25 is no longer necessary. Therefore, a sensor circuit for gain switching can be omitted, and the number of FPC wiring lines can be reduced.

In particular, an optical element (for example, a flat plate made of glass or resin) having a wavelength-dependent optical filter, such as a dichroic film, may be arranged at a position between the second dichroic PBS 19 and the first photodetector 17. With the arrangement, the transmittance of the first dichroic PBS 5 with respect to the emitted light of the red semiconductor laser 18 may be one-tenth. Instead of the above-described optical element having the dichroic film, a material, which is wavelength dependent or which absorbs light with a predetermined wavelength (for example, semiconductor particles, such as CdS) of the optical element, may be mixed into a material of the optical element.

Alternatively, in addition to the above-described optical element having the dichroic film, the material that absorbs light having a predetermined wavelength (for example, semiconductor particles, such as CdS) of the optical element may be mixed into the material of the optical element.

Still alternatively, the transmittance of the light beam passing through the first dichroic PBS 5 with respect to the emitted light of the red semiconductor laser 18 may be one-tenth by forming a dichroic film on a lens surface of the first sensor lens 16.

Further, alternatively, a dichroic film may be formed on a surface of a cover made of glass or resin, which is typically formed on a photodetecting surface of a photodetector to protect the photodetecting surface. In particular, a dichroic film is formed on a cover surface of the first photodetector 17, and hence, the transmittance of the light beam passing through the first dichroic PBS 5 with respect to the emitted light of the red semiconductor laser 18 may be one-tenth.

Accordingly, the ratio of the output of the first photodetector 17 during the RF/servo detection to the output during the light-source-output control becomes about 1:1.

Alternatively, the ratio of the output of the first photodetector 17 during the RF/servo detection to the output during the light-source-output control, as shown in Table 5, becomes about 1:1, by changing the wavelength dependence of the sensitivity of the first photodetector 17 to a value shown in Table 6. The wavelength dependence of the sensitivity of the first photodetector 17 can be changed, for example, by using the wavelength dependence of a material having a configuration for photoelectric conversion, or by forming a dichroic film on a light-incident side of the first photodetector 17.

The optical element described above, having the dichroic film thereon, and the first photodetector 17, having the dichroic film on the cover, may be combined for use.

TABLE 6

| | Use wavelength | |
|---|---|---|
| | 406 nm (blue) | 660 nm (red) |
| Ratio of sensitivity (A/W) | 1 | 0.15 |

Accordingly, the gain switch circuit 25 is no longer necessary. Hence, a sensor circuit for gain switching can be omitted, and the number of FPC wiring lines can be reduced.

Also, the deflecting mirror 20 may be omitted and optical paths to objective lenses may be separately provided without sharing an optical system.

For example, the present invention may be applied when the red semiconductor laser 18 is used, whereas another photodetector for light-source-output control may be applied when the blue semiconductor laser 4 is used, although the advantage of reducing the number of components is deteriorated as compared with this embodiment.

Also, the advantage of the present invention can be obtained even for a multi-layer recording medium having two or more layers. If reflectance is seriously deteriorated by the multi-layer arrangement, the number of times of switching by the gain switch circuit may be increased, or another gain switch circuit may be additionally provided at the second photodetector 22.

As described above, in the first and second optical systems having the first and second light sources with different wavelengths, the present invention can reduce the deterioration in the signal quality, and can reduce the number of components of the photodetector, thereby achieving a reduction in size of the apparatus.

While the present invention has been described with reference to exemplary embodiments, it is to be understood that the invention is not limited to the disclosed exemplary embodiments. The scope of the following claims is to be accorded the broadest interpretation so as to encompass all modifications and equivalents structures and functions.

Except as otherwise discussed herein, the various components shown in outline or in block form in the figures are individually well known in their internal construction and operation are not critical either to the making or using of the invention, or to a description of the best mode of the invention.

What is claimed is:

1. An apparatus for effecting at least one of recording and reproducing information, said apparatus comprising:
    a first light source having a light intensity and for emitting a light beam having an emission wavelength;
    a second light source having another light intensity and for emitting a light beam having an emission wavelength different from that of the first light source;
    a first photodetector capable of generating an output;
    a second photodetector capable of generating an output;
    an optical system configured to guide a light beam emitted from the first light source to a recording medium and to guide a light beam reflected from the recording medium to the first photodetector;
    another optical system configured to guide a light beam emitted from the second light source to the recording medium and to guide another light beam reflected from the recording medium to the second photodetector;
    a separating optical element configured to guide the light beam emitted from the first light source to the second photodetector, the second photodetector receiving the light beam and generating an output based on the received light beam; and
    a control circuit for receiving the output generated by the second photodetector, and being configured to control the light intensity of the first light source based on the output of the second photodetector.

2. The apparatus according to claim 1, wherein the separating optical element is a wavelength dependent dichroic polarizing beam splitter.

3. The apparatus according to claim 1, further comprising another separating optical element configured to guide the light beam emitted from the second light source to the first photodetector, the first photodetector receiving the light beam and generating an output based on the received light beam.

4. The apparatus according to claim 3, further comprising another control circuit for receiving the output generated by the first photodetector, and being configured to control the light intensity of the second light source based on the output of the first photodetector.

5. The apparatus according to claim 4, further comprising a gain switch circuit configured to switch an output gain of the first photodetector between an output gain when the first photodetector receives the reflected light beam from the recording medium, and an output gain to be used to control the light intensity of the second light source.

6. The apparatus according to claim 5, wherein the gain switch circuit is further configured to switch the output gain of the second photodetector between an output gain when the second photodetector receives the reflected light beam from the recording medium, and an output gain to be used to control the light intensity of the first light source.

7. The apparatus according to claim 3, further comprising a gain switch circuit configured to switch an output gain of the first photodetector between an output gain when the first photodetector receives the reflected light beam from the recording medium, and an output gain to be used to control the light intensity of the second light source.

8. The apparatus according to claim 7, wherein the gain switch circuit is further configured to switch the output gain of the second photodetector between an output gain when the second photodetector receives the other reflected light beam from the recording medium, and an output gain to be used to control the light intensity of the first light source.

9. The apparatus according to claim 3, wherein a wavelength dependent optical element is arranged between the other separating optical element and the first photodetector to adjust a ratio of an output gain of the first photodetector to be 1:1.

10. The apparatus according to claim 9, wherein a dichroic film is formed on the optical element to filter a wavelength of a light beam.

11. The apparatus according to claim 1, wherein the first light source is a blue semiconductor laser.

12. The apparatus according to claim 11, wherein the second light source is a red semiconductor laser.

13. The apparatus according to claim 1, wherein the first light source is a red semiconductor laser.

14. The apparatus according to claim 13, wherein the second light source is a blue semiconductor laser.

15. An apparatus for effecting at least one of recording and reproducing information, said apparatus comprising:
    a first light source having a light intensity and for emitting a light beam having an emission wavelength;
    a second light source having another light intensity and for emitting a light beam having an emission wavelength different from that of the first light source;
    a first photodetector capable of generating an output;
    a second photodetector capable of generating an output;
    an optical system configured to guide a light beam emitted from the first light source to a recording medium and to guide a light beam reflected from the recording medium to the first photodetector;
    a separating optical element configured to guide the light beam emitted from the first light source to the second photodetector, the second photodetector receiving the light beam and generating an output based on the received light beam;
    a control circuit for receiving the output generated by the second photodetector, and being configured to control the light intensity of the first light source based on the output of the second photodetector; and another control circuit for receiving the output generated by the first photodetector, and being configured to control the light intensity of the second light source based on the output of the first photodetector.

16. An apparatus for effecting at least one of recording and reproducing information, said apparatus comprising:

a first light source having a light intensity and for emitting a light beam having an emission wavelength;

a second light source having another light intensity and for emitting a light beam having an emission wavelength different from that of the first light source;

a first photodetector capable of generating an output;

a second photodetector capable of generating an output;

an optical system configured to guide a light beam emitted from the first light source to a recording medium and to guide a light beam reflected from the recording medium to the first photodetector;

a separating optical element configured to guide the light beam emitted from the first light source to the second photodetector, the second photodetector receiving the light beam and generating an output based on the received light beam; and a control circuit for receiving the output generated by the second photodetector, and being configured to control the light intensity of the first light source based on the output of the second photodetector, wherein a dichroic film is formed on a light-incident surface of the first photodetector to adjust a ratio of an output gain of the first photodetector to be 1:1.

* * * * *